INVENTORS
Carl B. Passmore Jr. &
Hubert C. Peterson Sr.
BY
McMorrow, Berman + Davidson
ATTORNEYS

United States Patent Office 2,732,650
Patented Jan. 31, 1956

2,732,650

FISHING LURE RETRIEVER

Carl B. Passmore, Jr., Harrison, and Hubert C. Peterson, Sr., Marshall, Ark.

Application November 13, 1953, Serial No. 391,806

1 Claim. (Cl. 43—17.2)

This invention relates to artificial fishing lures, and more particularly to a retriever for snagged or fouled lures.

It is an object of this invention to provide a retriever for artificial fishing lures when such lures are snagged or fouled on underwater objects such as logs, rocks or underwater vegetation.

It is a further object of this invention to provide a fishing lure retriever which is easy to carry in a small space and readily adapted to be placed in the ordinary tackle box, which is quickly and easily employed by the fisherman to recover a snagged lure, which is simple to operate, of rugged construction so as to withstand hard usage without damage and, if damaged, easily and quickly repaired.

Other objects and advantages will become apparent from the following detailed description, forming the specification, and taken in conjunction with the accompanying drawing, in which.

Figure 1:
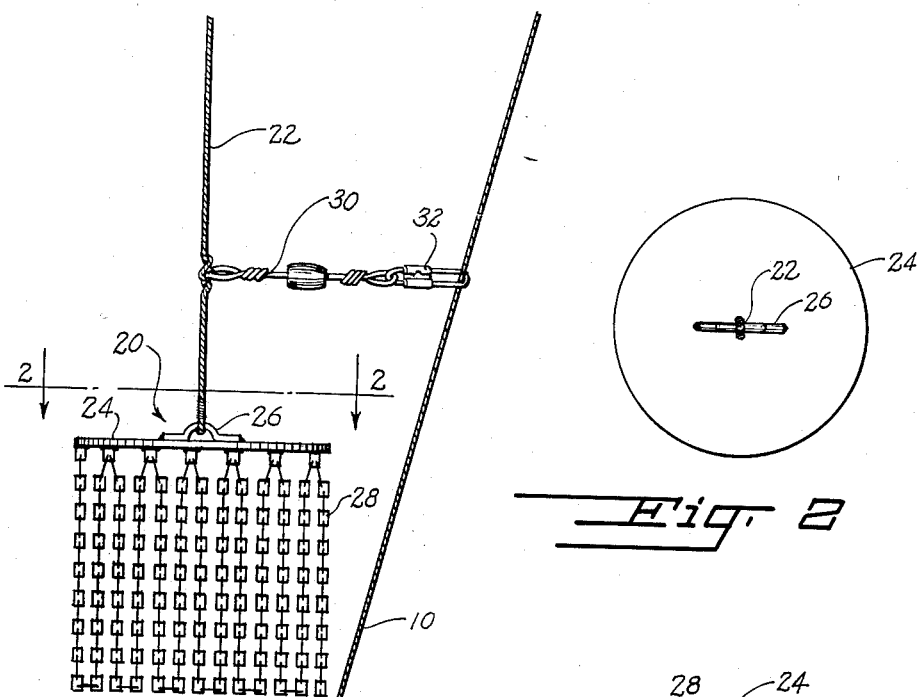
Figure 1 is a front elevational view of the retriever embodying this invention as it would appear when employed in conjunction with a fishing line to retrieve a snagged lure.
Figure 2:
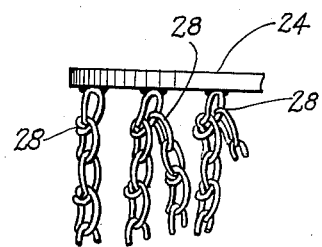
Figure 2 is a top plan view taken on line 2—2 of Figure 1.

In Figure 1, there is shown a fishing line 10 having an artificial lure 12 provided with the usual barbed hooks 14 and 16, the lure 12 being shown as snagged or fouled on an underwater obstruction 18, in the present illustration, the obstruction being a rock, although the obstruction may just as readily be a log or underwater vegetation.

In order to recover or retrieve the snagged lure 12, the retriever of the present invention may be used by the fisherman who is normally in a boat riding on the surface of the water. The retriever of the present invention is generally indicated at 20 and includes a cord 22 which may be a line of considerably greater strength than the fishing line 10, and has secured at one end thereof a circular disc or plate 24, the disc 24 being secured to the cord 22 by a bail member 26 carried centrally on the upper face of the disc 24.

Figure 3:
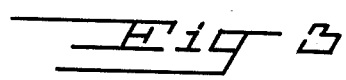
Figure 3 is a partial front elevational view of a portion of the retriever shown on a greatly enlarged scale to emphasize the manner in which the chain is mounted.
Figure 3:
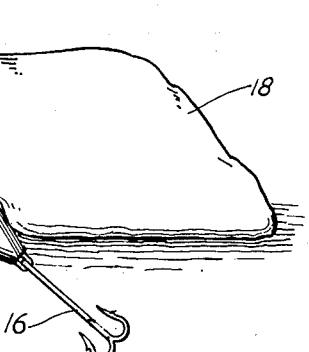

A chain 28 is dependingly carried by the plate or disc 24 on its lower face, the chain being secured to the plate at spaced intervals along its length so as to be hung in festoons to define a depending curtain which is adapted to be engaged by either of the hooks 14 or 16 of the snagged lure 12. The chain 28 may be secured to the under face of the disc 24 adjacent its perimeter by soldering links of the chain thereto at spaced intervals along the length of the chain 28 in such manner that the length of each chain section depending from the disc 24 will be approximately equal with alternate pairs of chain sections being joined together at their bottoms to form loops. Figure 3 shows this manner of chain attachment to the plate or disc 24. The plate 24 is preferably made of a suitable metal and is relatively small gauge or thickness.

Adjacent the end of the cord 22 to which the disc 24 is attached, a swivel connector 30 is carried by the cord 22 by having one end of the connector secured thereon. The other end of the swivel connector remote from the end carried by the cord 22 is provided with a keeper 32 which may be detachably connected to the fishing line 10 and slidable therealong.

When the lure 12 becomes lodged or fouled on an underwater obstacle, such as that shown in Figure 1, the fisherman attaches the retriever 20 to the fishing line 10 by snapping the keeper 32 about the fishing line 10, then pays out the cord 22 so that the retriever 20 will be lowered in spaced relation to the fishing line 10 and be guided to the fouled lure 12 by the fishing line. The end of the cord 22 remote from the end carrying the retriever 20 is manipulated by the fisherman so as to have either of the barbed hooks 14 or 16 become engaged in the curtain defined by the festoon hung chain 28 whereby the lure 12 may be dislodged from the obstacle and recovered for further use by the fisherman. It will be appreciated, that if the hooks of the fishing lure do not become enmeshed with the chain 28, the weight of the retriever 20 is such that the hooks can be caused to turn in a direction away from the obstacle by gravity so as to free the snagged lure 12 from the obstacle and facilitate its recovery.

From the foregoing, it will be apparent that there has been provided a retriever for a snagged fishing lure for use with a fishing line having a lure thereon in which the retriever comprises a cord manipulated at one end by the fisherman and having at the other end a metal plate carried by and secured thereto, a chain which is secured to and dependingly carried by the plate 24 hung in festoons adjacent its perimeter and a swivel connector 30 carried by the cord adjacent the end thereof carrying the plate 24 and detachably connectible to the fishing line 10 and slidable therealong so that the plate 24 and the depending chain 28 can be lowered in spaced relation to the fishing line and be guided by the fishing line to the snagged lure 12 so that the chains may be hooked by the barbed hooks 14 or 16 on the lure 12 whereby the snagged lure 12 may be freed from the underwater obstacle upon which the lure is snagged.

While there is shown and described the preferred embodiment of the invention, it is to be understood that the structure is susceptible to change and modification within the practicability of the invention and therefore should be limited only by the scope of the claim appended hereto.

What is claimed is:

A retriever for a snagged fishing lure having a fishing line attached thereto, said retriever comprising a cord manipulable at one end by the fisherman and the other end having a metal plate secured thereto, a chain secured to said plate and dependingly carried thereby, said chain being secured to said plate at spaced intervals along its length so as to provide pending spaced chain sections hung in festoons to define a depending curtain with alternate pairs of the depending chain sections being joined together at their bottoms to form loops, and a swivel connector carried by said cord adjacent the end of said cord to which said metal plate is secured, said connector being adapted to be detachably connected to said fishing line and slidable therealong so that said plate and chain can be lowered in spaced relation to said fishing line and be guided to said lure, said curtain defined by said chain adapted to be hooked by said lure to free the lure from an underwater obstacle upon which said lure is snagged as said cord is manipulated by a fisherman.

References Cited in the file of this patent

UNITED STATES PATENTS

| | | |
|---|---|---|
| 2,482,037 | Swaim | Sept. 13, 1949 |
| 2,494,012 | Stricker | Jan. 10, 1950 |
| 2,676,430 | Richard | Apr. 27, 1954 |